United States Patent [19]
Yamasaki et al.

[11] Patent Number: 5,963,937
[45] Date of Patent: *Oct. 5, 1999

[54] FORMAT CONVERSION OF STORAGE DATA USING AN EFFICIENT DIVISION OF DATA

[75] Inventors: Nobuhiro Yamasaki; Yoshiki Watanabe; Hiroshi Hayata, all of Nakai-machi, Japan

[73] Assignee: Fuji Xerox Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/634,674

[22] Filed: Apr. 18, 1996

[30] Foreign Application Priority Data

Aug. 30, 1995 [JP] Japan ...................... 7-245442

[51] Int. Cl.⁶ ........................................ G06F 17/00
[52] U.S. Cl. ........................ 707/4; 707/103; 707/201
[58] Field of Search .................. 707/1–206, 501–515

[56] References Cited

U.S. PATENT DOCUMENTS

| | | | |
|---|---|---|---|
| 5,339,392 | 8/1994 | Risberg et al. | 395/161 |
| 5,511,188 | 4/1996 | Pascucci et al. | 395/600 |
| 5,537,157 | 7/1996 | Washino et al. | 348/722 |
| 5,608,874 | 3/1997 | Ogawa et al. | 395/200.15 |

FOREIGN PATENT DOCUMENTS

| | | |
|---|---|---|
| 2-54370 | 2/1990 | Japan . |
| 5-225034 | 9/1993 | Japan . |

OTHER PUBLICATIONS

"Linear Hashing: A New Tool For File And Table Addressing", Witold Litwin; 1980 IEEE, pp. 212–223.

"Working With Persistent Objects: To Swizzle Or Not To Swizzle", J. Eliot B. Moss, IEEE Transactions on Software Engineering, vol. 18, No. 8, Aug. 1992 657–673.

*Primary Examiner*—Maria N. Von Buhr
*Assistant Examiner*—David Yiak Jung
*Attorney, Agent, or Firm*—Oliff & Berridge, PLC

[57] ABSTRACT

A database apparatus to realize faster processing for data including a plurality of elements such as objects by conducting the loading and storing process accompanying format conversion only on necessary elements. Objects in storage format in the secondary memory apparatus are written as computable format onto the cache for processing by the application program. In addition, objects in computable format in the cache are written out as storage format on the secondary memory apparatus. A first determination device determines whether invalid or valid elements are contained in at least a portion of the object held in the cache based on status information that is held in the cache. Based on the results of this determination, a second determination device determines which elements in the object are invalid or valid and for invalid elements, the corresponding elements held in storage format are converted to computable format by the loading means and written into the cache while valid elements are converted to storage format by the storage device and written out to the page cache. Furthermore, the reading and writing device writes these out to the secondary memory apparatus.

18 Claims, 13 Drawing Sheets

FORMAT CONVERSION OF STORAGE DATA USING AN EFFICIENT DIVISION OF DATA

BACKGROUND OF THE INVENTION

1. Field of the Invention

The present invention relates to a load process that converts data that is stored in a secondary memory device in a storage format into a computable format and reads this into a main memory device. A data storage process converts the data that is held in computable format in the main memory into a storage format and writes this to a secondary memory device. More particularly, the present invention relates to a database apparatus that determines validity and conducts the loading and storing process for each element that comprises data.

2. Description of Related Art

When a process is executed on data that is stored in a secondary memory apparatus in a database management system, the data is read from the secondary memory apparatus into a main memory apparatus. Processes such as display and editing are executed on the data in the main memory apparatus using an application program that is installed on the information processing apparatus.

In the database management system, normally the data that is accumulated in the secondary memory apparatus is in a data format suitable for accumulation (i.e., a storage format) and the data that is held in the main memory apparatus is in a data format suitable for processing (i.e., computable format). Consequently, data format conversion is conducted between the secondary memory apparatus and the main memory apparatus at the time of the loading and storing processes.

In an object-oriented database management system, a load process is conducted where objects in storage format, which are collections of element data, in the secondary memory apparatus are converted to computable format and written to the main memory apparatus. A storing process is conducted where objects in computable format in the main memory apparatus are converted to storage format and written to the secondary memory apparatus. These processes are conducted using pointer conversion.

The pointer conversion of this kind of object-oriented database management system is disclosed in "Working with Persistent Objects: To Swizzle or Not to Swizzle" (J Eliot B. Moss) in *IEEE Transaction on Software Engineering* (Vol. 18, No. 8, 1992) and in Japanese Laid-Open Patent Publication Hei 5-225034, the subject matters of which are incorporated herein by reference. Various disclosures are made relating to the conversion method and the determination of validity of the converted objects.

In the former document, a bulk conversion method (a page at a time method called the Eager method) is disclosed where data is read from the secondary memory apparatus into the main memory apparatus in page units with all of the objects in the page undergoing pointer conversion at once. A successive conversion method (object at a time method called the Lazy method) disclosed where the objects within the page undergo pointer conversion when needed.

In the latter document, a method is disclosed where information indicating the status of the converted objects is found for each object and the validity of the converted data is determined using this status information. The status of an object can be valid or invalid. Valid is set through conversion being executed. Alternatively, invalid is set when a transaction that alters the contents of the object has been abnormally concluded or when a transaction that alters the contents for the same object through another information processing device has been normally concluded.

In a database management system, not only objects but also indexes and buckets that are used in high-speed searching of data and collections that are collections of a plurality of objects are also accumulated in a storage format in the secondary memory apparatus. At the time of processing, these are converted into a computable format and held in the main memory apparatus. "Linear hashing: A new tool for file and table addressing" (W. Litwin) in IEEE Proc. 6th Conf. VLDB 1980, the subject matter of which is incorporated herein by reference, discloses a method of linear hashing in which indexes are represented by a plurality of structure elements. In this linear hashing, data is expressed in a layered structure of buckets that are a collection of a plurality of elements (corresponding to keys and values) and indexes that manage these bucket groups.

In addition, Japanese Laid-Open Patent Publication Hei 2-54370, the subject matter of which is incorporated herein by reference, discloses a method for loading the top structure and the bottom structure of these indexes of layered structure in order into the main memory apparatus.

Conventionally, by conducting the loading storing processes accompanying format conversion in object units and bucket units, processes corresponding to unnecessary objects and buckets can be eliminated in comparison to when loading processes and storing processes are conducted in page units that contain a plurality of objects and index units that contain a plurality of buckets. By shortening the calculation processing time needed for format conversion, the loading process and storing processes can be speeded up.

However, even when conducting these format conversion processes in object units and bucket units when only element data of a portion of the plurality of element data items that are included in objects are referenced by the application program or when only the element data of a portion of the plurality of element data items (key and value groups) contained in the buckets are referenced, the format conversion process is also conducted for the element data that is not the target of referencing. Consequently, unnecessary conversion processes are executed at this point making it impossible to achieve adequate speeding of processes.

This kind of situation becomes striking the larger the number of element data items that comprise a single object or a single bucket thus becoming a large factor impeding the speeding up the loading process and storing process accompanying format conversion.

SUMMARY OF THE INVENTION

It is an object of the present invention to solve the above problems by realizing the loading process or storing process accompanying format conversion between the secondary memory apparatus and the main memory apparatus as element units that include objects, indexes or collections.

It is another object of the present invention to conduct validity management of each element accompanying the conducting of the loading process or storing process in element units using attaching status information that determines the validity of the data.

The database apparatus of the present invention causes data containing a plurality of elements that are objects, collections or indexes to be held in the main memory apparatus in computable format and causes status information of the data relating to the validity of the data to be held. The database apparatus conducts the loading process and the storing process in element units that are contained in the data based on this data status information.

A first determination device determines, based on the data status information, whether invalid elements are contained in at least a portion of the data held in the main memory apparatus or a valid element is contained in at least a portion. A second determination device determines which of the elements in the data are invalid or valid based on the first determination result. Furthermore, for elements that are determined to be invalid, the loading device converts the corresponding elements held in storage format in the secondary memory apparatus (or in the page cache) into computable format and writes these to the main memory apparatus. The storage device converts valid elements to storage format and writes these out to the secondary memory apparatus (or the page cache).

Consequently, an area that holds the data status information is provided in the main memory apparatus and held as: "UNINITIALIZED" that indicates that the data is in an uninitialized state and is invalid, "VALID" that indicates that all of the elements have been converted to computable format and are valid, "IN PROGRESS" that indicates that a portion of the elements in the data are valid and "INVALID" that indicates that all or a portion of the elements in the data have been converted to computable format but these are invalid. This data status information is changed accompanying the loading and storing processes.

It is possible to include the main memory device as a cache memory and to hold data that has been read from the secondary memory device that accumulates the database and has been converted to computable format.

Furthermore, the main memory device may include a cache memory that holds the data in computable format and a page cache memory that holds the data in storage format that is read from the secondary memory device in page units, to have reading and writing processes for the data in storage format conducted between the page cache memory and the secondary memory device, to cause the data in storage format that has been read from the page cache memory to be converted to computable format and held in the cache memory or to cause data in computable format held in the cache memory to be converted to storage format and held in the page cache memory and to thereby boost the speed of the loading process and storing process.

Other objects, advantages, and salient features of the invention will become apparent for the detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

The database apparatus according to a preferred embodiment of the present invention will be described using an example of the apparatus applied to an object-oriented database management apparatus that conducts loading and storing processes on objects (data).

Figure 1:
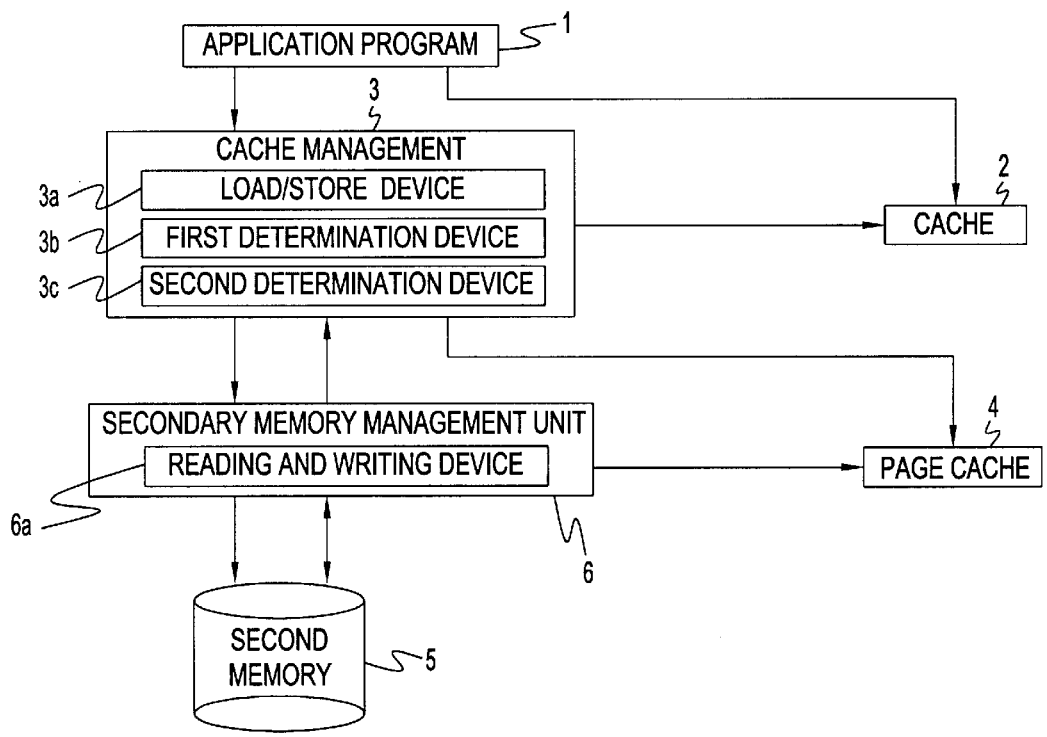
FIG. 1 is a diagram of an object-oriented database management system according to an embodiment of the present invention.

As shown in FIG. 1, the database management apparatus includes an application program 1 that executes various processes such as editing, a cache 2 that holds the objects in computable format, a cache management unit 3 that conducts management processes on the cache 2, a page cache 4 that holds pages containing a plurality of objects in storage format, a secondary memory apparatus 5 that accumulates the database including a plurality of pages in storage format and a secondary memory management unit 6 that manages reading and writing of pages between the page cache 4 and the secondary memory apparatus 5.

The cache 2 and the page cache 4 are included in the main memory apparatus so that data that is held therein can be accessed quickly. In addition, the secondary memory apparatus 5 is a large capacity memory that includes a magnetic disk apparatus or the like to accumulate the data that is a collection of objects so that these can be freely written to and read from.

Figure 2:
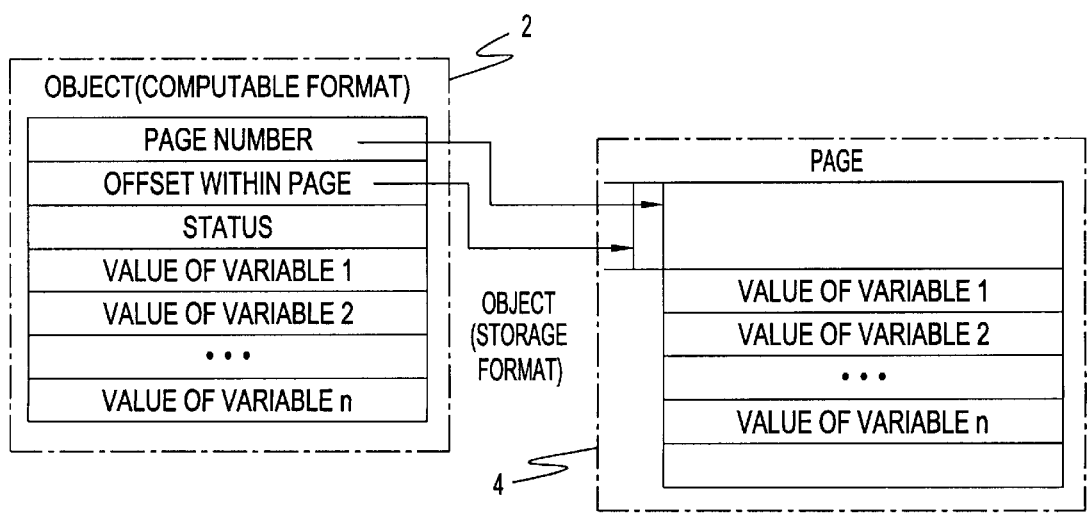
FIG. 2 is a diagram showing the objects that are held in the cache and the page cache.

The objects in computable format that are held in the cache 2 and the objects in storage format that are held in the page cache 4 have the correspondence shown in FIG. 2. Through this correspondence relationship, the reading and writing of objects or individual elements of the objects are conducted between the cache 2 and the page cache 4.

As shown in FIG. 2, in addition to the contents (the value of the variable) of each element in computable format, a page number, offset in the page and cache status information are attached to the objects that are held in the cache 2. The page number indicates on which page an object is contained and the offset in the page indicates the position (address) that the object is contained within the page.

The cache status information indicates the validity of the object that is held in the cache 2. Status information is held such as: "UNINITIALIZED" that indicates that the data is in an uninitialized state and is invalid, "VALID" that indicates that all of the elements have been converted to computable format and are valid, "IN PROGRESS" that indicates that a portion of the elements in the data are valid and "INVALID" that indicates that all or a portion of the elements in the data have been converted to computable format but are invalid.

As will be described below with reference to FIG. 3, the status of the cache is changed accompanying changes in the contents of the object by the loading and storing processes. This status information is rewritten by the cache management unit 3.

The application program 1 uses the computable format objects that are held in the cache 2 and executes the target process while altering the element data (variable value) that is contained in the object. Furthermore, during use of this object, the application program 1 issues commands to the cache management unit 2 such as referencing the object, reading (loading) and writing (storing).

The loading process commands include a load entry command that causes a single element in the object to be read to the cache 2 and a load command that causes all elements in the object to be read to the cache 2. The storing process commands include a store entry command that causes a single element in the object to be written to the page cache 4 from the cache 2 and a store command that causes all of the elements in the object to be written to the page cache 4 from the cache 2.

The cache management unit 3 has a load/store device 3a that executes the loading process and the storing process. When a command is received from the application program 1, the contents of an object that is held in the page cache 4 in storage format are converted to computable format in the loading process and written to the cache 2. The contents of an object that is held in the cache 2 in computable format in the storing process is converted to storage format and written to the page cache 4 using the load/store device 3a.

The cache management unit 3 has a first determination device 3b that determines the validity of the object based on the cache status information and a second determination device 3c that determines the validity of each individual element in the object based on the determination made by the first determination device 3b. The load/store device 3a executes the loading process and storing process for each element in the object based on the determinations made by the determination devices 3b and 3c.

The secondary memory management unit 6 has a reading and writing device 6a that reads and writes pages. When a command is received from the cache management unit 3 based on commands from the application program 1, the reading and writing device 6a reads and writes objects in page units between the page cache 4 and the secondary memory apparatus 5.

When corresponding pages that are accumulated in the secondary memory apparatus 5 are updated by another apparatus and an inconsistency arises in the page contents between the secondary memory apparatus 5 and the page cache 4, the secondary memory management unit 6 overwrites the page that is held in the page cache 4 using the page that has been updated based on the commands from the application program 1. This updating of the page is communicated to the cache management unit 3. Through this communication, the cache management unit 3 conducts a process that rewrites the above-described cache status information and records the inconsistency in the contents between the object held in the page cache 4 and the object held in the cache 2.

Figure 3:
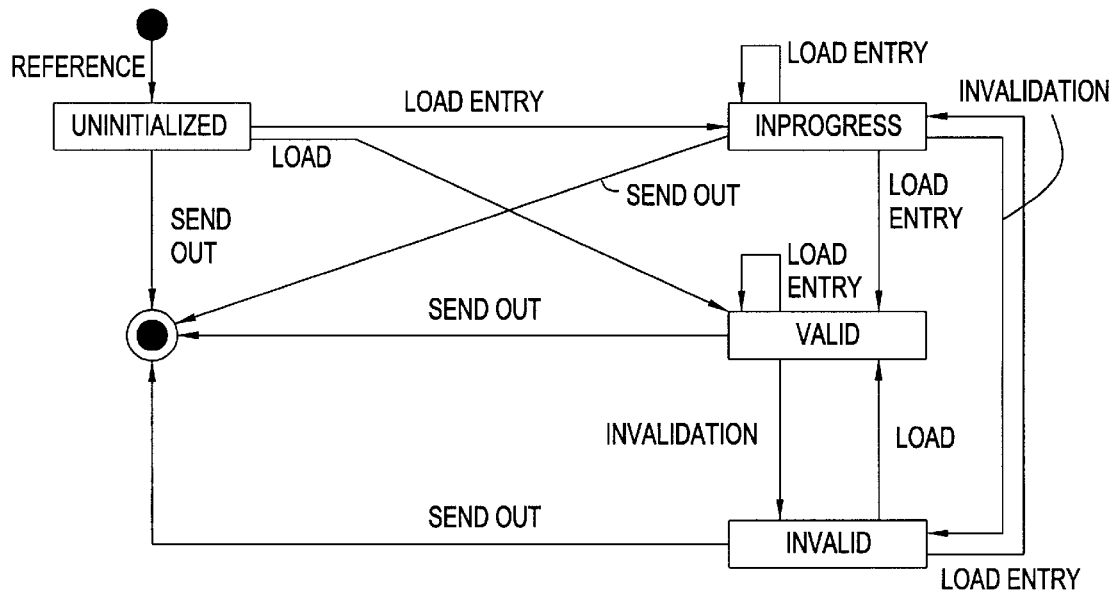
FIG. 3 is a diagram showing the changing of the status of the cache that holds objects in computable format.

The status of the object in the cache 2 changes accompanying various processes as shown in FIG. 3.

The object is first secured in the cache 2 using a reference command from the application program 1 to the cache management unit 3. The status of the cache 2 at this time becomes "UNINITIALIZED."

When a load entry command is executed in the cache management unit 3 under the "UNINITIALIZED" status, one element (variable value) in the object that is designated by the command is read from the page cache 4 into the cache 2. The status of the cache 2 is changed to "IN PROGRESS" that indicates that a portion of the elements in the object are valid. In this "IN PROGRESS" status, only the elements that have been read are valid in the cache. When a load entry command is repeatedly executed in the cache management unit 3 from this "IN PROGRESS" status, the invalid elements may be made valid but the status remains "IN PROGRESS."

In addition, when the load command is executed in the cache management unit 3 under the "UNINITIALIZED" status, all of the elements in the object are read from the page cache 4 into the cache 2 and the status of the cache 2 changes to "VALID" to indicate that all of the elements in the object are valid. Even if the load command or load entry command is repeatedly executed from this "VALID" status, the "VALID" status does not change.

When a load command is executed in the cache management unit 3 under the "IN PROGRESS" status, all of the elements in the object are read from the page cache 4 into the cache 2 and the status of the cache 2 changes to "VALID" to indicate that all of the elements in the object are valid. Even if the load command or load entry command is repeatedly executed from this "VALID" status, the "VALID" status does not change.

Figure 5:
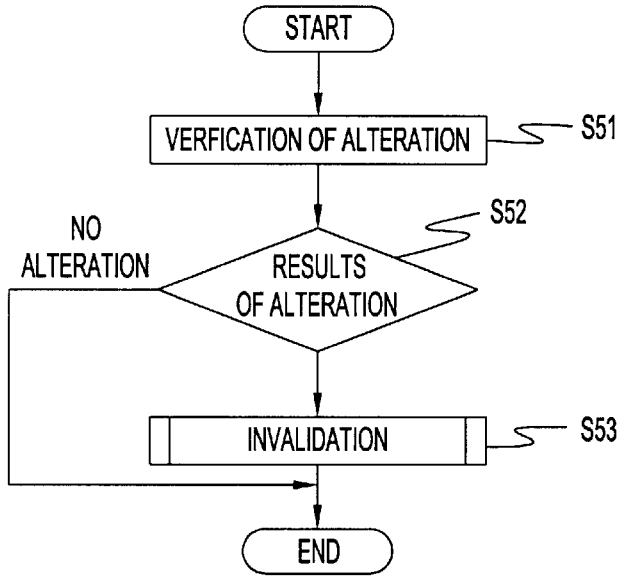
FIG. 5 is a flowchart showing the process of verifying the contents of an object.

In the "VALID" status, the contents of the object in the cache 2 are equivalent to the contents that are accumulated in the secondary memory apparatus 5. When the contents that were accumulated in the secondary memory apparatus 6 have been altered by another application program, it is necessary to take another look at the contents of the object in the cache 2. Consequently, at a preset time or a time when the need has arisen, a command for alteration verification is sent to the cache management unit 3 from the application program 1 and the cache management unit 3 executes a verification process (FIG. 5). When an alteration exists, the status is changed to "INVALID" to indicate that all of the elements in the object are invalid and the contents of all of the elements in the object are deleted.

When a load process or load entry process is executed from the "INVALID" status, all or a portion of the elements in the object are read from the page cache 4 into the cache 2 and the status changes to "VALID" or "INVALID." When the cache management unit 3 determines that use of this object has been concluded from any of these statuses, the object is dismissed from the cache 2 and this region is freed.

The processes of the database management apparatus having the above-described composition will be described with reference to the flowcharts in FIGS. 4–10.

Figure 4:
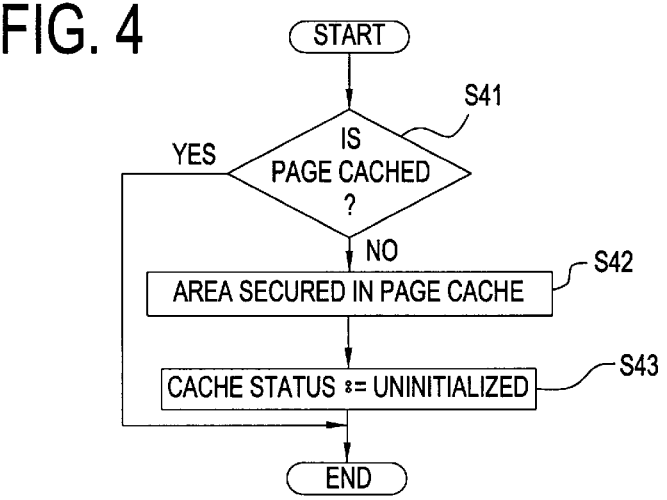
FIG. 4 is a flowchart showing the process of referencing objects.

FIG. 4 shows the sequence of the process that starts the referencing of an object held in the cache 2.

The cache management unit 3 detects (step S41) whether there is an object in the cache 2 based on commands from the application program 1. When there is an object in the cache 2, this referencing process is concluded.

On the other hand, when there is no object in the cache 2, an area for holding an object in the cache is secured by the cache management unit 3 (step S42), the status information is initialized to "UNINITIALIZED" (step S43) and the process is concluded.

FIG. 5 shows the process that verifies the contents of an object held in the cache 2.

The cache management unit 3 and secondary memory management unit 6 verify (steps S51, S52) whether alteration has been made of the data that is accumulated in the secondary memory apparatus 5 based on a command from the application program 1. When there has been no alteration, the process is concluded. However, when there has been an alteration, the cache management unit conducts an invalidation process (step S53) and the process is then concluded.

Verification of the absence or presence of an alteration can be easily conducted using a method such as recording the time that the object was last read from the secondary memory apparatus 5 and the time when the object in the secondary memory apparatus 5 was last altered, comparing these times and determining that an alteration has occurred if the time of alteration is later.

Figure 6:
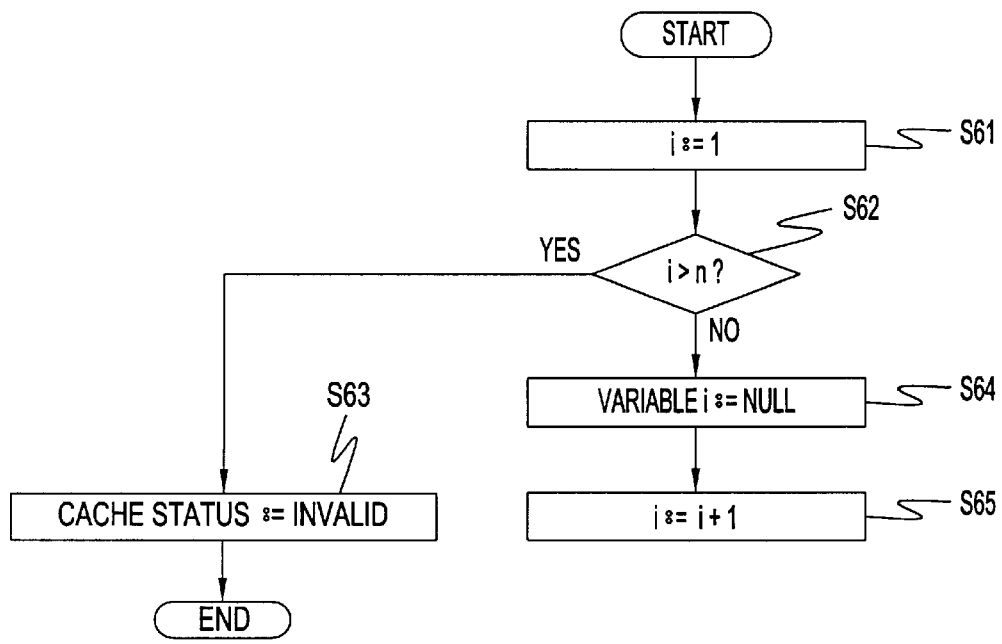
FIG. 6 is a flowchart showing the process of invalidating the cache of an object.

FIG. 6 shows the invalidation process (step S53) of the object that is held in the cache 2.

The ith element contained in the object is initialized to "1" (step S61) and invalidation is conducted for each element until the total number n of elements contained in the object has been reached while incrementing the value of i by one. While the value of i is not greater than n, a process is conducted (step S64) that sets the contents (variable value) of this ith element to "NULL." This is repeatedly conducted (step S65) while incrementing the value of i by 1. When the value of i exceeds n (step S62), the status of the cache 2 is set to "INVALID" (step S63).

Accordingly, through this invalidation process, all of the elements of the object held in the cache 2 become invalid. This status is indicated by "INVALID."

Figure 7:
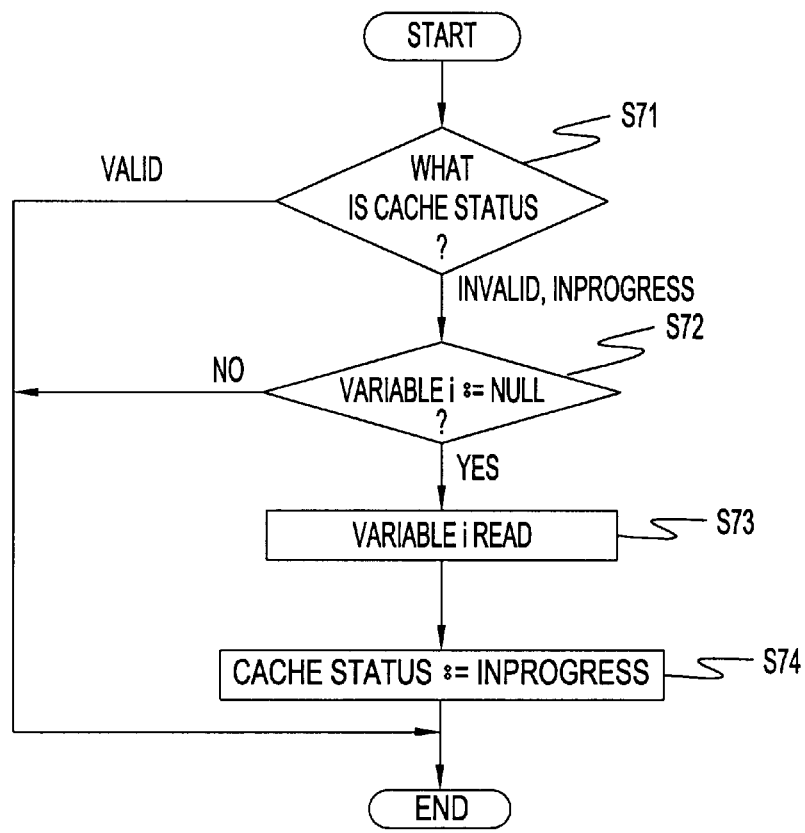
FIG. 7 is a flowchart showing the load entry process.

FIG. 7 shows the sequence of the load entry process for the cache 2. When the number i of the element that is the target is provided along with a command from the application program 1, the cache management unit 3 examines the status information that is held in the cache 2 (step S71). When this result is that the status is "VALID," the ith element is valid and the process concludes because it is not necessary to conduct the loading process.

On the other hand, when the status of the cache 2 is "INVALID" or IN PROGRESS," the cache management unit 3 examines the contents (value of variable i) of the ith element in the object that is held in the cache 2. When these contents are not "NULL" and are valid, the process concludes because it is not necessary to conduct the loading process on this ith element.

In contrast, when the contents of the ith element are "NULL", the cache management unit 3 reads the contents of the ith element from the page cache 4, converts this to computable format and reads this into the cache 2 (step S73). Furthermore, the status of the cache 2 changes to "IN PROGRESS" (step S74) and the process then concludes.

Accordingly, in the object that is held in the cache 2, at least the ith element has a valid status and the status that at least a portion of the elements in this object are valid is indicated by "IN PROGRESS."

Figure 8:
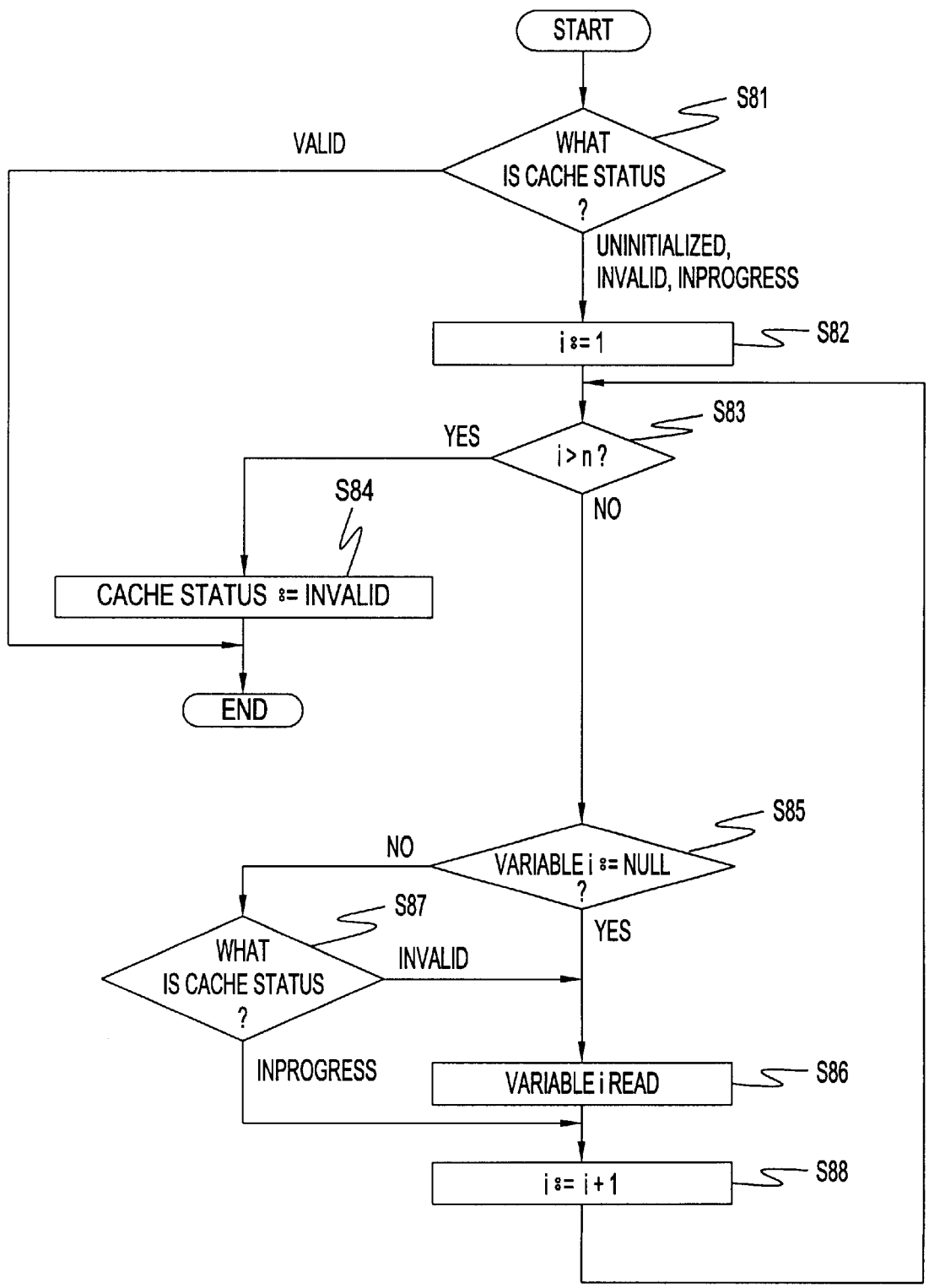
FIG. 8 is a flowchart showing the loading process.

FIG. 8 shows the sequence of a loading process for the cache 2. The cache management unit 3 examines the status information that is held in the cache 2 (step S81) based on a command from the application program 1. When this result is that the status is "IN PROGRESS," all of the elements in the object have previously been read from the page cache 4 and are valid so the process is concluded because it is not necessary to conduct the loading process.

On the other hand, when the status of the cache 2 is "UNINITIALIZED", "INVALID" or IN PROGRESS," the cache management unit 3 initializes the ith element in the object held in the cache 2 to "1" (step S82) and repeatedly conducts the process described below until the total number n of elements that are contained in the object has been reached while incrementing the value of i by 1.

That is, while the value of i is not greater than n, an examination is made whether the contents (variable value) of this ith element are "NULL" (step S85). When this is "NULL," the contents of this ith element are read from the page cache 4, converted to computable format and then read into the cache 2 (step S86). The same process is repeatedly conducted (step S88) while incrementing the value of i by 1. When the contents are not "NULL," the status of the cache 2 is verified (step S87). When the status is "INVALID," all the elements in the object have yet to be read into the cache 2 and are invalid so the same process (steps S86, S88) is repeatedly conducted because it is necessary to conduct the loading process.

On the other hand, when the contents of the ith element are not "NULL" while the status of the cache is "IN PROGRESS" (step S87), the contents of the element are valid and have already been read into the cache 2. Consequently, the value of i is incremented by 1 and the process is conducted for the next element (step S88).

This kind of loading process determines whether invalid elements are contained in at least a portion of the object from the status of the cache 2. When invalid elements are contained, this process determines which elements are invalid while incrementing the value of i by 1 so that the reading process from the page cache 4 and the format conversion process are conducted only on invalid elements.

Furthermore, when the value of i exceeds n as a result of repeatedly conducting the above processes (step S83), the status of the cache 2 becomes "VALID" and the process is concluded (step S63).

In the object that is held in the cache 2, all of the elements are read and come to have a valid status and the status of this object is indicated by "VALID".

Figure 9:
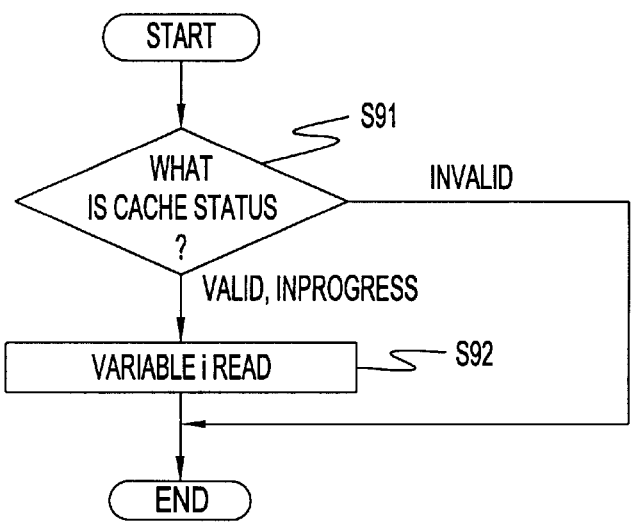
FIG. 9 is a flowchart showing the store entry process.

FIG. 9 shows the store entry process for the cache 2. When the number i of the targeted element is given along with a command from the application program 1, the cache management unit 3 examines the status information that is held in the cache 2 (step S91). When the result of this is that the status is "INVALID," the ith element is invalid and the process concludes because it is not necessary to conduct the storing process.

On the other hand, when the status of the cache 2 is "VALID" or "IN PROGRESS," the cache management unit 3 writes the contents (the value of variable i) of the ith element in the object that is held in the cache 2 into the page cache 4 (step S92) and the process concludes. The contents of the element that is written to the page cache 4 is written out to the secondary memory apparatus 5 by the secondary memory management unit 6.

Figure 10:
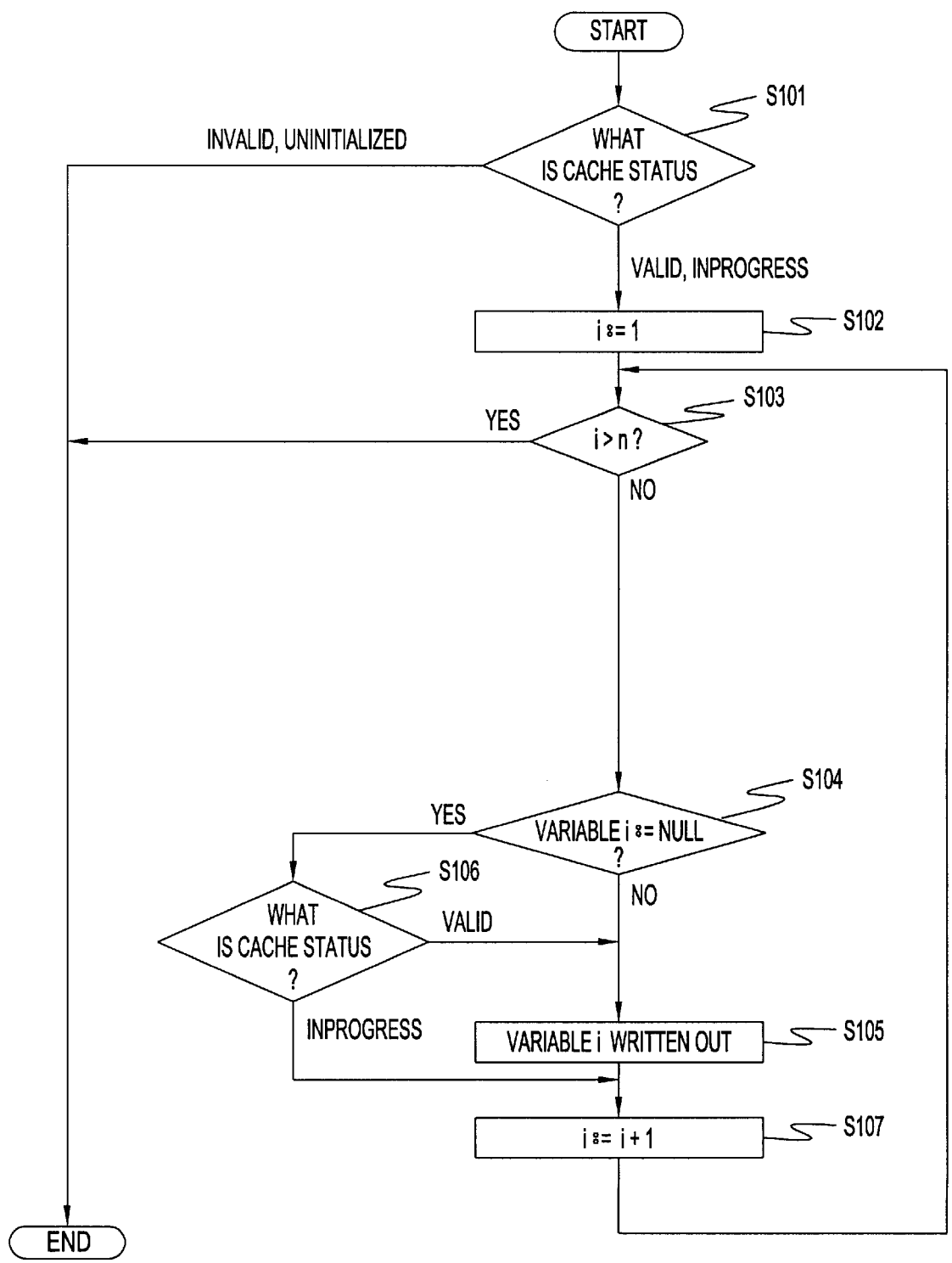
FIG. 10 is a flowchart showing the storing process.

FIG. 10 shows the storing process for the cache 2. The cache management unit 3 examines the status information that is held in the cache 2 (step S101) based on a command from the application program 1. When the result of this is that the status is "INVALID" or "UNINITIALIZED," the contents of the object that is held in the cache 2 are not valid. Consequently, the process concludes without writing out to the page cache 4.

On the other hand, when the status of the cache 2 is "VALID" or "IN PROGRESS," the cache management unit 3 initializes the ith element in the object that is held in the cache 2 to "1" (step S102) and the below-described process is repeatedly conducted until the total number n of elements contained in the object is reached while incrementing the value of i by 1.

While the value of i is not greater than n, an examination is made (step S104) whether the contents (variable value) of this ith element are "NULL." When these contents are not "NULL" and are valid, the contents of this ith element are read from the cache 2, converted to storage format and then written to the page cache 4 (step S105). The same process is repeatedly conducted (step S107) while incrementing the value of i by 1. When the contents are "NULL," the status of the cache 2 is verified (step S106). When this status is "VALID," all of the elements in the object are invalid. Consequently, the same process (steps S105, S107) is repeatedly conducted.

On the other hand, when the contents of the ith element are "NULL" while the status of the cache is "IN PROGRESS" (step S106), the contents of this element are invalid. Consequently, the value of i is incremented by 1 and the process is conducted for the next element (step S107).

In this way, the storing process determines whether valid elements are contained in at least a portion of the object from the status of the cache 2. Furthermore, when valid elements are contained, the storing process determines which elements are valid elements while causing the value of i to be incremented so that the process of writing out to the page cache 4 from the cache 2 and the format conversion process are conducted only for valid elements.

Furthermore, the process is concluded when the value of i exceeds n as a result of repeatedly conducting the above-described series of processes (step S103). The contents of the elements that have been written out to the page cache 4 are written to the secondary memory apparatus 5 by the secondary memory management unit 6.

Another embodiment of a database management apparatus according to the present invention for elements contained in a collection (data) will now be described.

A collection is data that combines a plurality of objects. Each object is managed by the object-oriented database management system shown in FIG. 1. Accordingly, a link is established in the collection and in each object to the page that is stored in the page cache 4.

Figure 11:
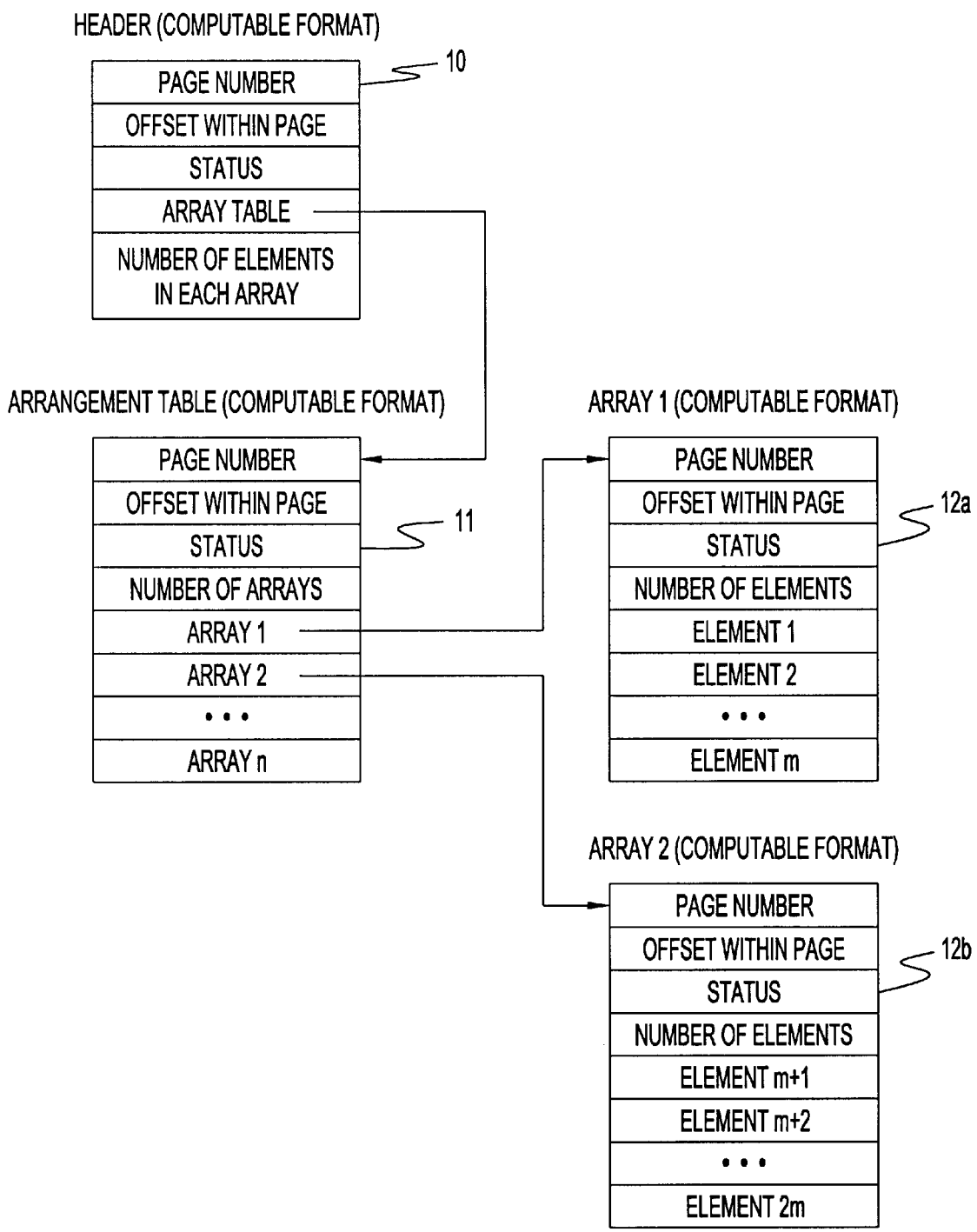
FIG. 11 is a diagram showing a collection corresponding to a second embodiment of the present invention.

The collection that is held in computable format in the cache 2 includes a header 10, an array table 11 and arrays 12a, 12b, etc. as shown in FIG. 11. The collection contains an arbitrary number of arrays 12a, 12b, etc.

The header 10 is an object in which variables used to manage the collection as a whole are recorded containing "page number", "offset in the page", "status information", "array table" and "number of elements for each array." The "page number", "offset in the page" and "status information" are the same variables as in the above-described embodiment while the "array table" variable indicates the array table 11. In the "number of elements for each array" variable, the number of elements for each array 12a, 12b, etc., which is managed by the array table 11, are recorded.

The array table 11 is an object in which variables are recorded for managing the plurality of arrays 12a, 12b, etc. The array table 11 has variables "page number", "offset in the page", "status information", "number of arrays" and "identifiers for each array." The "page number," "offset in the page" and "status information" are the same variables as in the above-described embodiment while in the "number of arrays" variable, the total number of arrays 12a, 12b, etc. that are managed by the array table 11 is recorded. In the "array" variable, the identifiers of each array 12a, 12b, etc. that are managed by the array table 11 are recorded.

The arrays 12a, 12b, etc. are objects that contain a plurality of elements that are the target of the loading and storing processes. In addition to the same "page number", "offset in the page" and "status information" described above, the "number of elements" are recorded to indicate the number of elements contained in these arrays 12a, 12b, etc. and the contents of each element.

In the page cache 4, collections having the same composition as described above are held in storage format.

Figure 12:
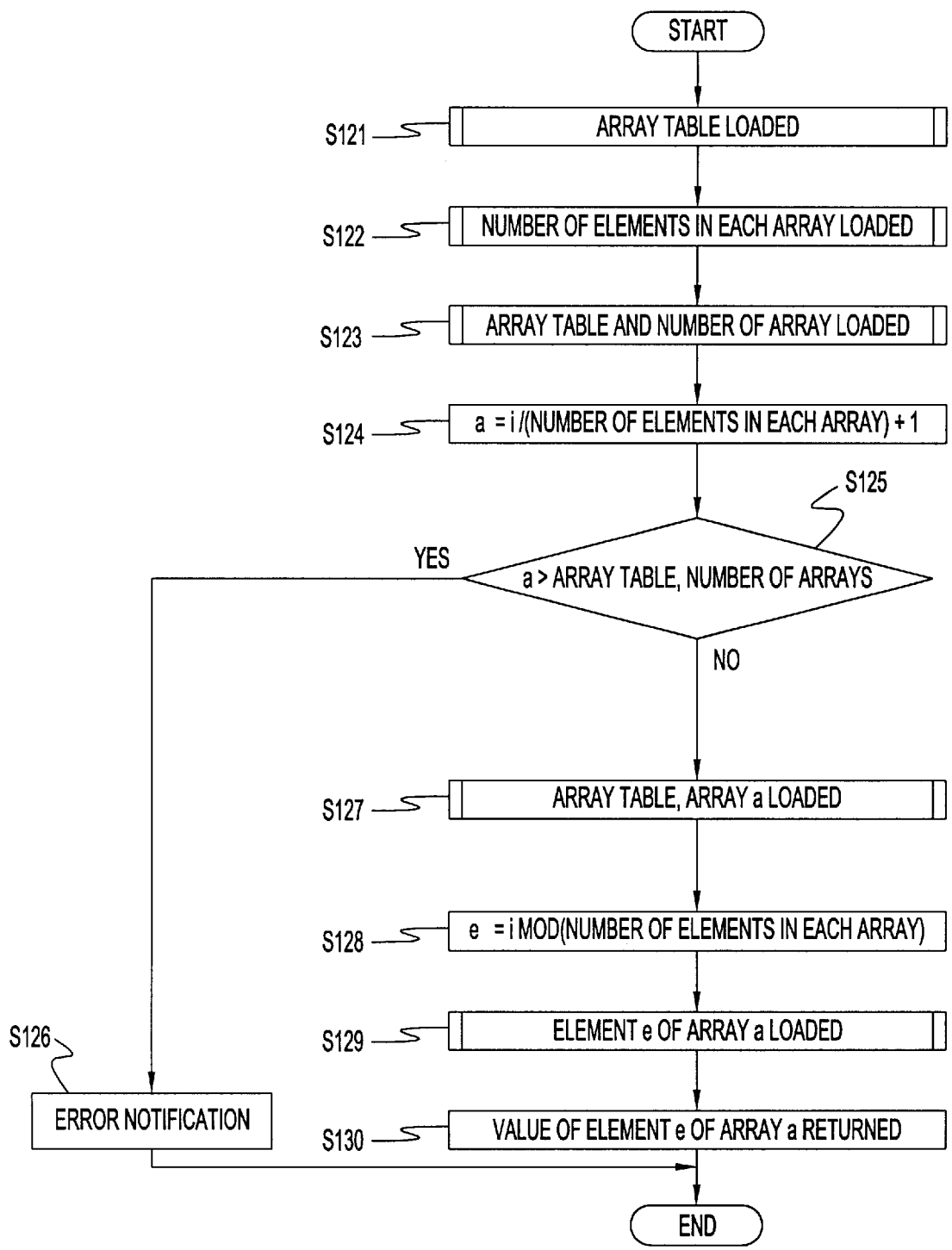
FIG. 12 is a flowchart showing the process of reading the elements of a collection.

FIG. 12 shows the sequence through which the cache management unit 3 loads the ith element from the page cache 4 to the cache 2 that is contained in one of the arrays 12a, 12b, etc. in the collection.

The load entry process of FIG. 7 is applied and the "array table" and "number of elements for each array", which are variables for the header 10, are loaded (steps S121, S122). Furthermore, the "number of arrays" that is a variable for the array table 11 is loaded (step S123).

Next, ((i / "number of elements for each array")+1) is calculated and the number a of the array 12a, 12b, etc. containing the ith element that is specified from the application program 1 is found (step S124). For example, when each of the arrays 12a, 12b, etc. contains 10 elements and when the 23rd element is specified, the 23rd element is contained in the third row is found from the integer portion of (23/10)+1=3.3.

An examination is then made (step S125) whether the value of a is larger than the value of the "number of arrays" that is a variable for the array table 11. When this is larger, the value of the i that has been specified is too large and the array 12a, 12b, etc. that contains the ith element does not exist. Consequently, the application program 1 is notified of an error and the process concludes (step S126).

On the other hand, when the value is determined to not be too large as a result of the examination, the load entry process described with reference to FIG. 7 is applied, the ath "array" of the array table 11 is loaded (step S127), the remainder from dividing the value of i by the value of "the number of elements in each array" is calculated (step S128), and which element (the eth element) in the ath array is the ith element is found. For example, the 23rd element (i=23) is contained in the third array, but the fact that the 23rd element that has been specified is the third element contained in the third array is found from the remainder after dividing 23 by the value 10 of the "number of elements in each array. "

The load entry process of FIG. 7 is applied and the eth element in the ath array is loaded from the page cache 4 into the cache 2 (step S129). The value of this element is sent to the application program 1 and the process concludes.

Accordingly, the loading process is conducted for each element contained in the object (array) the same as in the above-described embodiment even for collections.

Figure 13:
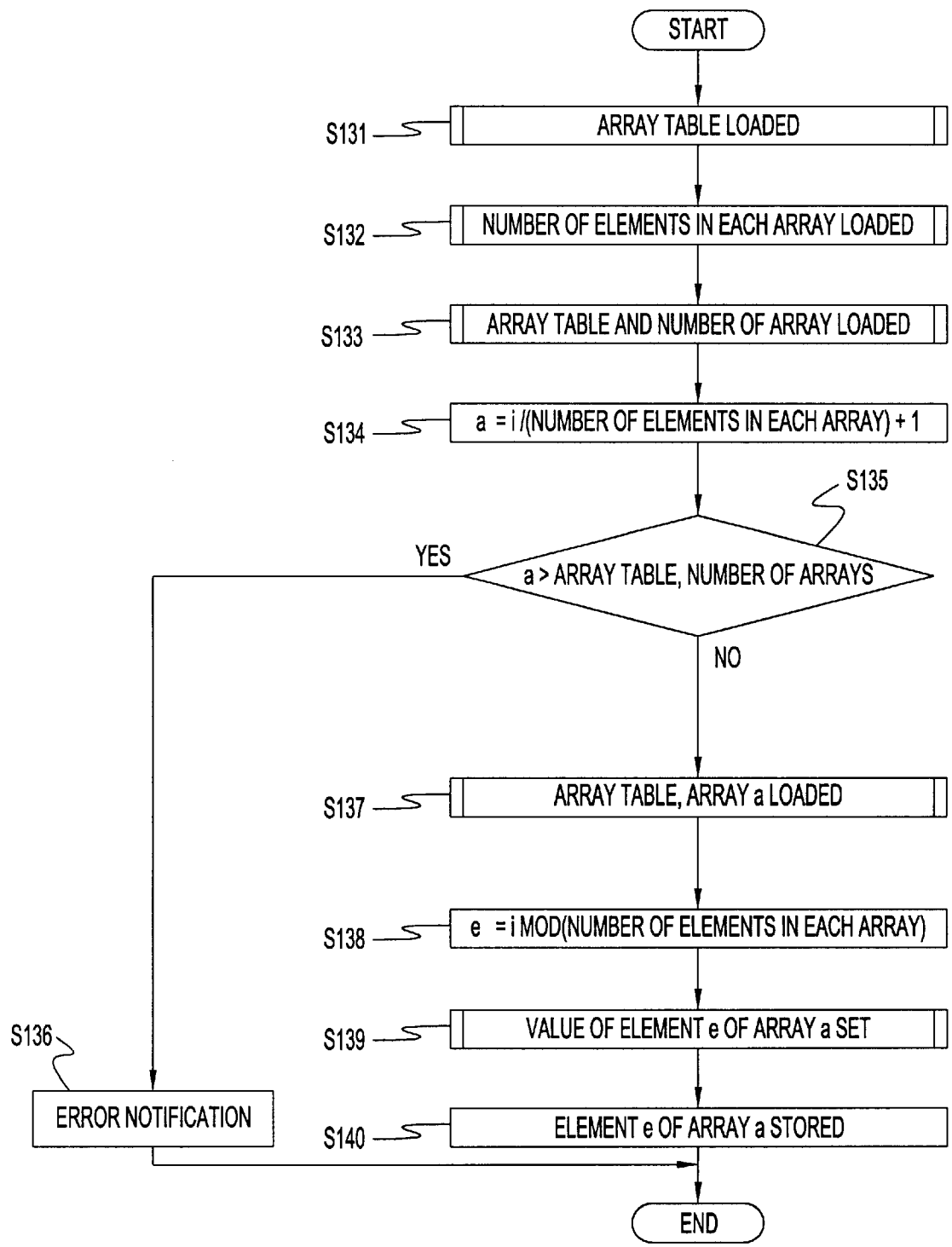
FIG. 13 is a flowchart showing the process of writing the elements of a collection.

FIG. 13 shows the sequence in which the cache management unit 3 stores the ith element contained in one of the arrays 12a, 12b, etc. in the collection from the cache 2 to the page cache 4.

All of the processes in steps S131 through S139 of this storing process are the same as the processes shown in FIG. 12. Only step S140 differs. That is, the store entry process of FIG. 9 is applied and the eth element in the ath array is stored from the cache 2 to the page cache 4 and the process then concludes.

Accordingly, the storing process is conducted for each element contained in the object (array) the same as in the above-described embodiment even for collections.

Another embodiment of a database management apparatus in which the present invention has been applied to the loading process and storing processes for elements (key and value groups) contained in buckets (data) of indexes will now be described.

Figure 14:
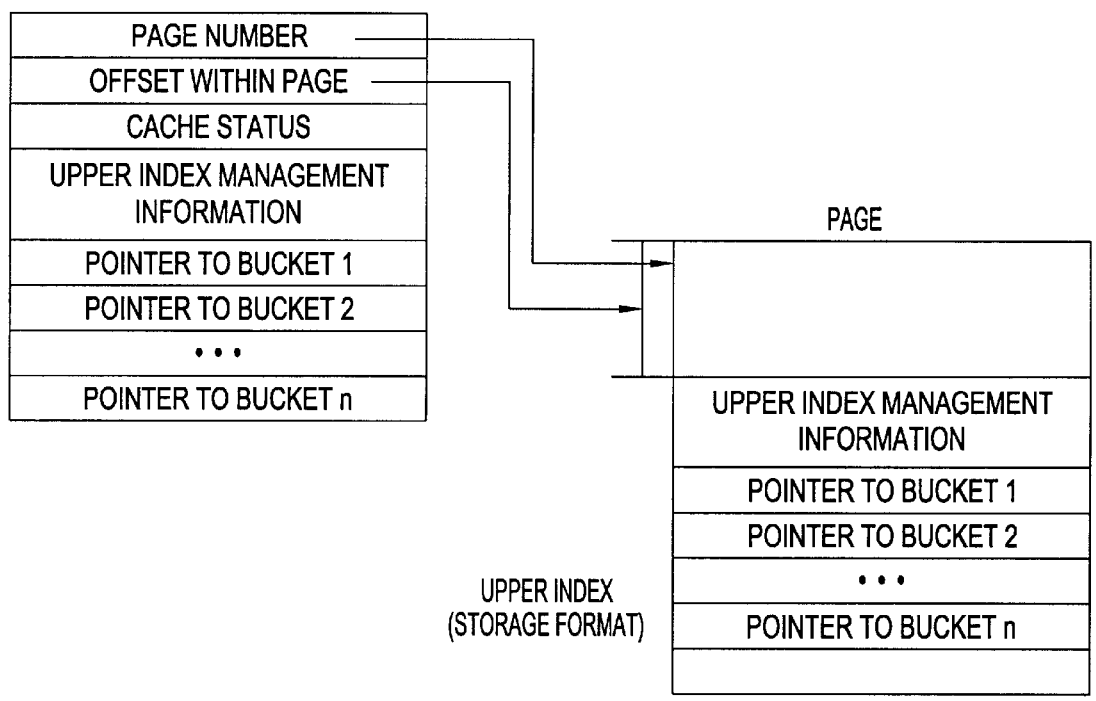
FIG. 14 is a diagram showing the composition of an index and upper index according to a third embodiment of the present invention.
Figure 15:
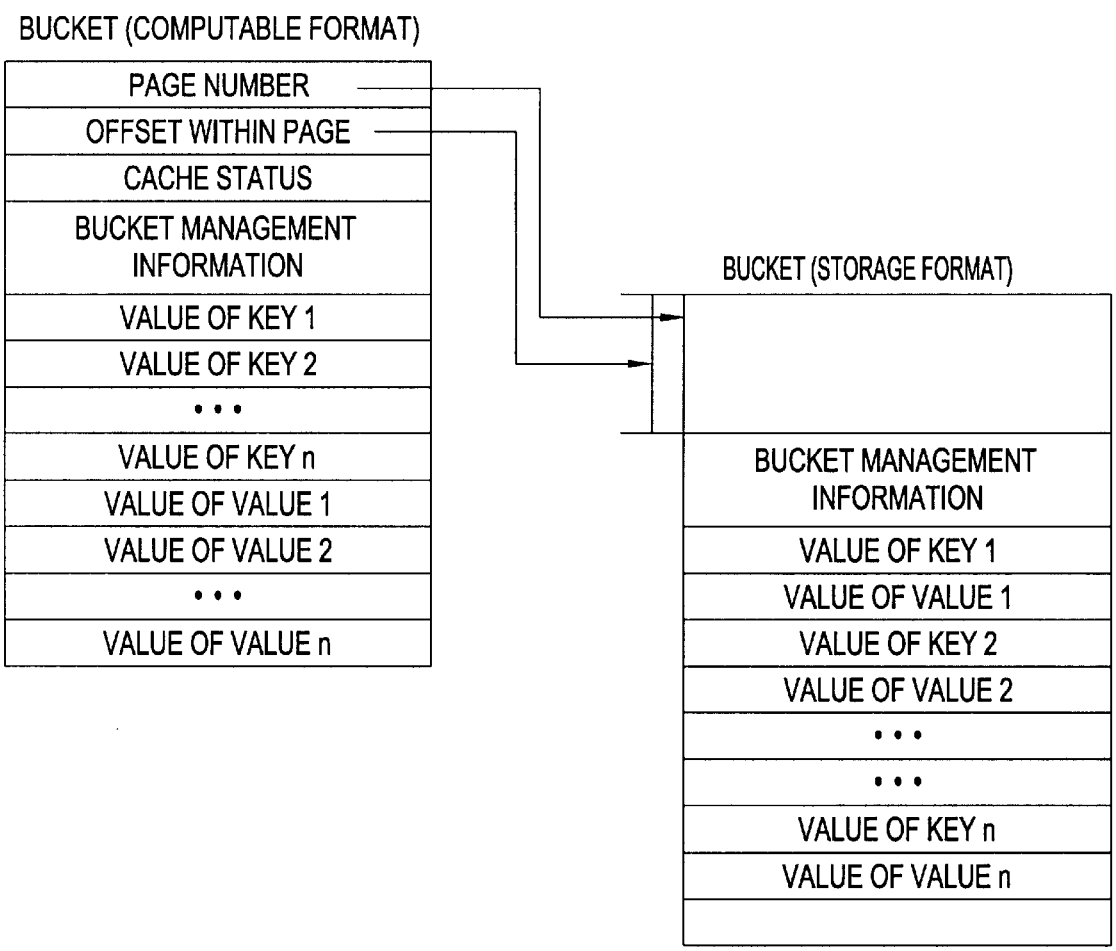
FIG. 15 is a diagram showing the bucket of an index according to the third embodiment.

The index is data with a layered structure that manages the plurality of buckets with the upper index. The upper index and each bucket are managed by the database management system shown in FIG. 11. Accordingly, as shown in FIGS. 14 and 15, the upper index and buckets are each held in the cache 2 in computable format and held in the page cache 4 in storage format. The processes of loading, storing and referencing each of the elements or all of the elements can be realized as processes in which the elements have been replaced by entries that show pointers to buckets or key and value groups and objects have been replaced by buckets or upper indexes in the processes for objects described with reference to FIGS. 3 through 10.

In the upper indexes and buckets that are held in computable format in the cache 2, "page number", "offset within the page" and "status of the cache" are recorded for each. These "page number", "offset within the page" and "status of the cache" show the same contents as in the above-described embodiments.

In addition, in the upper index of both the computable format and the storage format, "upper index management information" is recorded that contains information used to determine the bucket corresponding to the index key and load feeder information for the index as a whole. In addition, a "pointer" to the bucket is recorded to which this upper index manages.

In addition, in the buckets in both computable format and storage format, "bucket management information" is recorded that contains the number of entries in the bucket. In addition, elements for each entry that include groups of keys and values that are pointers to data are recorded.

Figure 16:
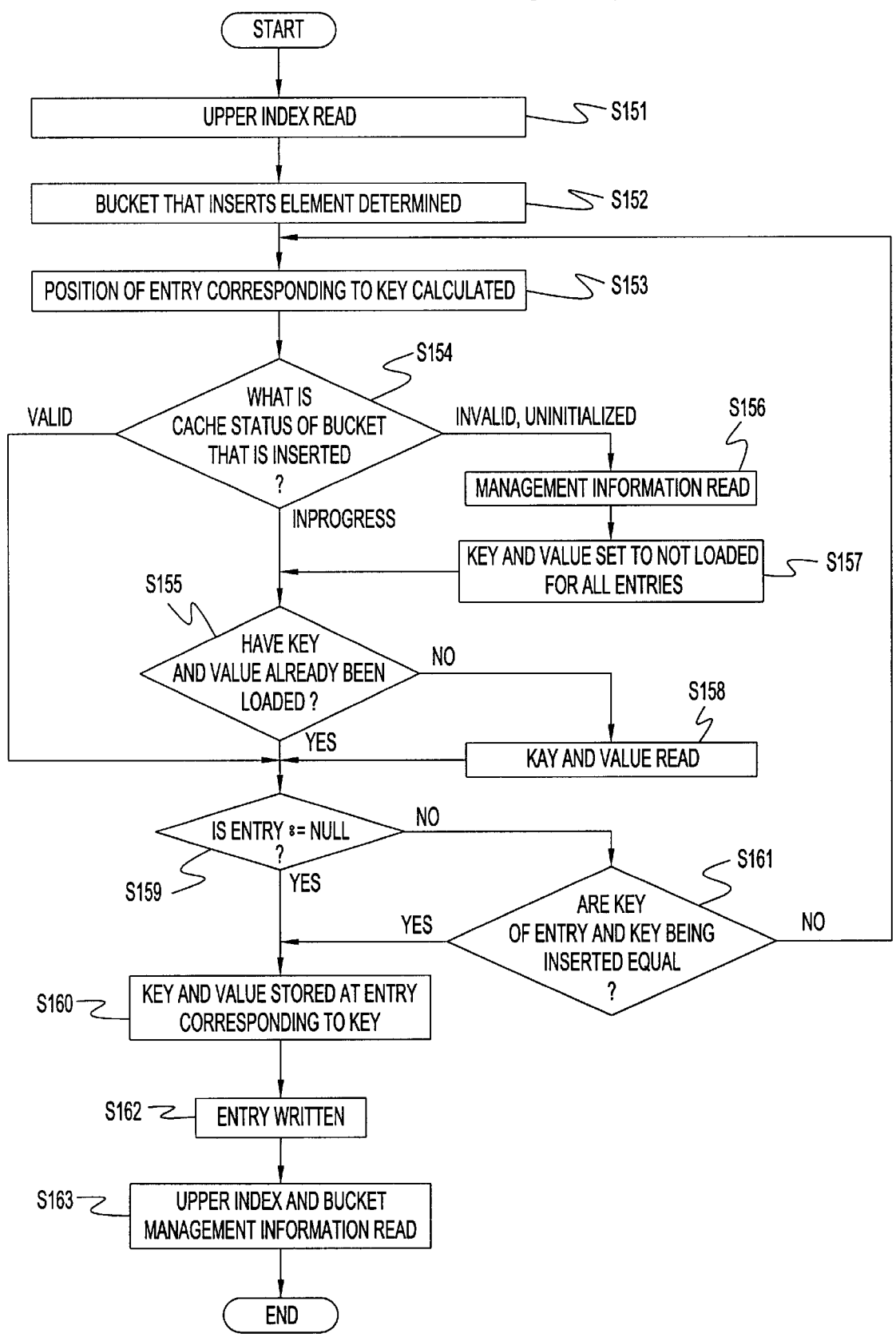
FIG. 16 is a flowchart showing the process of inserting the element data into the index.

FIG. 16 shows the process of converting elements (groups of keys and values) in storage format into the computable format and inserting these into the computable format index using the loading process.

In the explanation hereafter, processes for cases where candidates for entries corresponding to keys in the entries cannot be found, extension entries are deleted or buckets overflow in the index process are not considered.

With the present embodiment, the loading process for each element in only buckets is applied and first the upper index is read (step S151).

Next, the bucket corresponding to the key of the element that is inserted is determined (step S152) using criteria such as no discrepancy occurring between the buckets in the inserted number of elements by the "upper index management information" of this upper index. Furthermore, the position of the entry corresponding to the key of the element that is inserted in this bucket is calculated (step S153).

Next, the "status of the cache" of the bucket that was determined to be the insertion target is found (step S154). When this status is "INVALID" or "UNINITIALIZED", the "bucket management information" for the bucket is read (step S156) and the unique value "NOT LOADED" that indicates that the key and value have not been loaded for all of the entries of this bucket is inserted into the "bucket management information" (step S157).

Furthermore, an examination is made whether the key and value have already been loaded in the position of the entry that was calculated in step S153 (step S155) and the key and value (element) that are the insertion target are read from the page cache 4 (step S158).

On the other hand, when the result of the determination (step S154) is that the status is "VALID," the process moves to step S159. However, when the status is "IN PROGRESS," the determination process in step S155 is conducted and when the key and value have not already been loaded to the position of the entry that was calculated, the key and value (element) that are the target of insertion are read (step S158).

Next, a determination is made whether the key and value of the position of the entry that was calculated are "NULL" (step S159). When these are "NULL," the key and value that are the target of insertion at this entry position are each substituted (step S160).

On the other hand, when the position of the entry that was calculated is not "NULL," a determination is made whether the key of this entry is equal to the key that is inserted (step S161). When these are equal, substitution of the insertion target is conducted and the contents of the entry are overwritten (step S160). However, when these are not equal, the next entry candidate corresponding to the key is calculated (step S153) and the above-described series of processes (steps S154–S159) is again conducted.

Through this kind of process, after the alteration of the value of the entry that was calculated has been completed, this entry is returned to computable format and written to the cache 2 (step S162), the change in the management information is written to the upper index and the bucket that inserts the entry (element). The process is then concluded (step S163).

Accordingly, a loading process can be conducted even for indexes on each element (entry) that is contained in the bucket the same as in the above-described embodiments.

Figure 17:
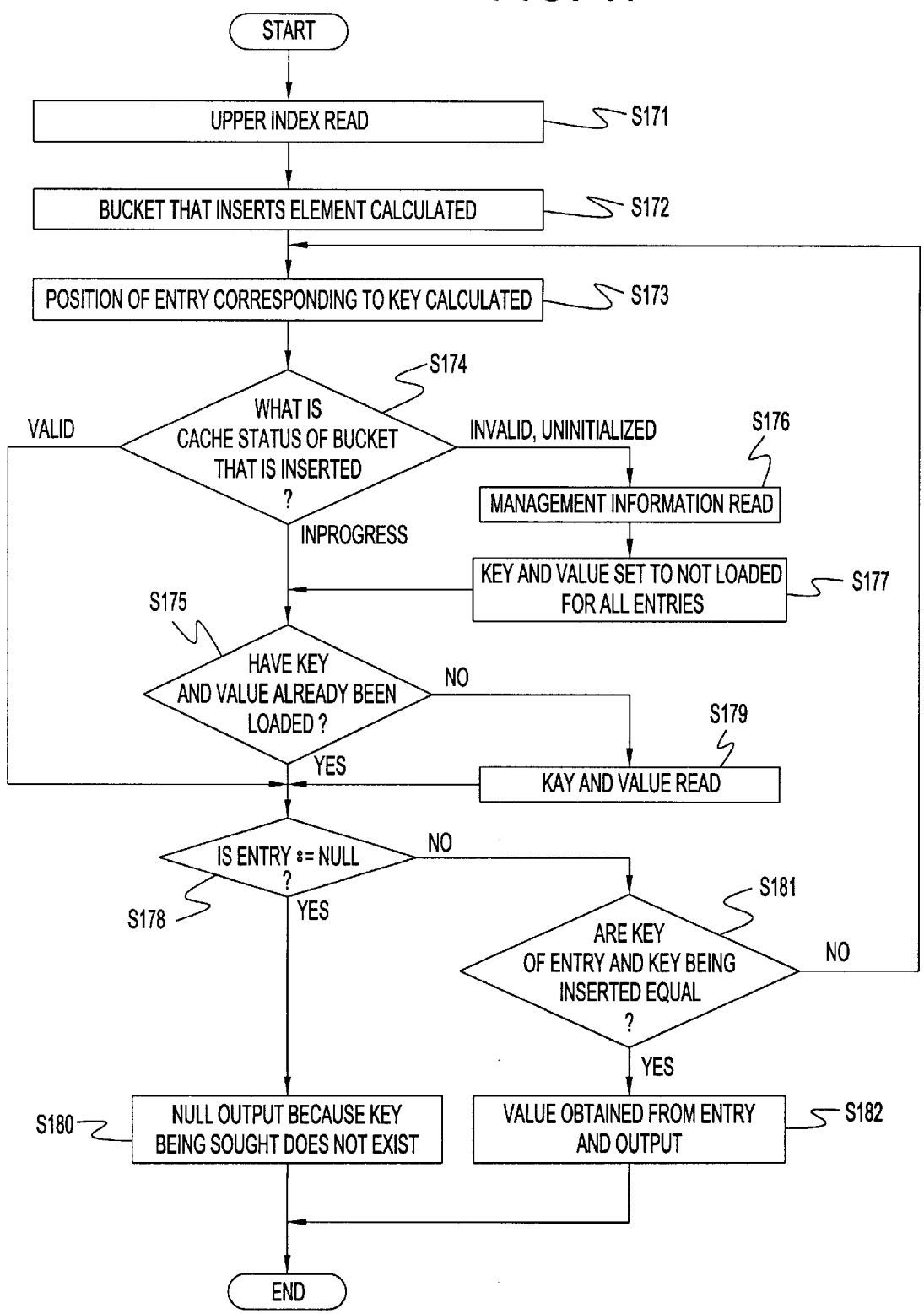
FIG. 17 is a flowchart showing the process of searching element data from the index.

FIG. 17 shows the process by which the application program 1 finds the element data corresponding to an index from the computable format index.

This finding process calculates the entry position corresponding to the finding key. This is the same as the process (steps S151–S159) described above with reference to FIG. 16 through the process (steps S171–S179) of examining whether the contents of this entry are "NULL".

Furthermore, when the contents of the entry are "NULL" (step S178), element data that is the target of the search does not exist. Consequently, "NULL" is output to the application program 1 and an error is communicated (step S180), following which the process concludes. Furthermore, when the contents of the entry are not "NULL" (step S178), an examination is made whether the key of this entry is equal to the key of the entry being searched (step S181). When these are equal, the value is acquired from this entry and is output to the application program, following which the program concludes. However, when these are not equal, the next entry candidate corresponding to the search key is calculated (step S173) and the above-described series of processes (steps S174 through S179) are again conducted.

With the database management apparatus of the present invention, it is possible to conduct in element data units the loading process and storing process accompanying format conversion between the main memory device and the secondary memory device for a collection of a plurality of element data such as objects, collections and indexes. Consequently, in comparison to the case where the loading and storing processes are conducted in units of objects, it is possible to eliminate processes for unnecessary element data. Accordingly, it is possible to speed up the loading and storing process.

In addition, the status of the object, index or collection on the main memory device is held in units of the collection of this element data and a determination device determines the validity of each element data based on the status information of this data. Consequently, it is possible to realize faster speed for the loading and storing processes without securing for each element data an area for holding the status information of the data in the main memory device.

While the invention has been described in relation to preferred embodiments, many modifications and variations are apparent from the description of the invention. All such modifications and variations are intended to be within the scope of the present invention as defined in the appended claims.

What is claimed is:

1. A database apparatus that writes pieces of data in storage format on a secondary memory device and in computable format on the main memory device to process the pieces of data, the database apparatus comprising:

secondary memory means for storing pieces of data each of which includes a plurality of elements as data in storage format;

main memory means for storing pieces of data, each of which includes a plurality of elements as data in computable format, and for storing validity of the pieces of data, the validity indicating consistency between elements in each of the pieces of data stored in the main memory means and elements in a corresponding piece of data stored in the secondary memory means;

a main memory manager that performs a check as to whether one of the nieces of data stored in the secondary memory means has been updated, and updates the validity of the pieces of data stored in the main memory means in accordance with the check;

first determination means for determining whether one of the pieces of data stored in the main memory means contains at least one element that is inconsistent with the corresponding element in the secondary memory means based on the validity of the pieces of data stored in the main memory means;

second determination means for determining an invalid element in a piece of data which is inconsistent with the corresponding element in the secondary memory means, the first determination means determining that at least one element of that piece of data is inconsistent with the corresponding element in the secondary memory means; and loading means for converting the element in storage format that corresponds to the element that the second determination means has determined to be invalid into computable format, the main memory manager updating the validity of the pieces of data stored in the main memory means in accordance with loading of the element by the loading means.

2. The database apparatus of claim 1, further comprising loading request signal receiving means for receiving a loading request for an element of data, the first determination means determining whether at least one invalid element is contained in the data that is recorded in the main memory means containing the element for which the loading request has been received by the loading request receiving means, the second determination means determining whether the element for which the loading request has been received is invalid, and when the second determination means determines that the element for which the loading request has been received is invalid, the loading means converts the element in storage format corresponding to this element into computable format and writes this element to the main memory means.

3. The database apparatus of claim 1, wherein the validity stored in the main memory means includes a first status indicating that all of the elements in a piece of data have been converted to computable format and consistency with the corresponding elements in the piece of data in the secondary memory means is guaranteed, a second status indicating that for at least one of the elements of the piece of data, consistency with the corresponding element in the secondary memory means is guaranteed, and a third status indicating that for all elements in the piece of data in the main memory means, consistency with the corresponding elements in the piece of data in the secondary memory means is not guaranteed.

4. The database apparatus of claim 1, further comprising invalidation means for writing a predetermined value indicating that an element has not been read to each area unit where the element is stored in the area for storing data in the main memory means, the second determination means determining that an element is invalid when the predetermined value has been written to the area unit in the main memory means.

5. A database apparatus that writes out pieces of data in computable format on a main memory device and in storage format on a secondary memory device, the database apparatus comprising:

secondary memory means for storing pieces of data, each of which includes a plurality of elements as data in storage format;

main memory means for storing pieces of data, each of which includes a plurality of elements as data in computable format, and for storing validity of the pieces of data, the validity indicating consistency between elements in each of the pieces of data stored in the main memory means and elements in a corresponding piece of data stored in the secondary memory means;

a main memory manager that performs a check as to whether one of the pieces of data stored in the secondary memory means has been updated, and updates the validity of the pieces of data stored in the main memory means in accordance with the check;

first determination means for determining whether one of the pieces of data stored in the main memory means contains at least one element that is consistent with the corresponding element in the secondary memory means based on the validity of the pieces of data stored in the main memory means;

second determination means for determining a valid element in a piece of data which is consistent with the corresponding element in the secondary memory means, the first determination means determining that at least one element of that piece of data is consistent with the corresponding element in the secondary memory means; and storage means for converting the element in computable format that corresponds to the element that the second determination means has determined to be valid into storage format, and for storing the element from the main memory means in the secondary memory means.

6. The database apparatus of claim 5, further comprising storing request receiving means for receiving a storing request for an element of data, the first determination means determining whether at least one valid element is contained in the data that is recorded in the main memory means that contains the element for which the storing request has been received, the second determination means determining whether the element for which the storing request has been received is valid, wherein when the second determination means determines that the element for which the storing request has been received is valid, the storing means converts this element into storage format and writes this element out from the main memory means to the secondary memory means.

7. The database apparatus of claim 5, wherein the validity stored in the main memory means includes a first status indicating that all of the elements in a piece of data have been converted to computable format and consistency with the corresponding elements in the piece of data in the secondary memory means is guaranteed, a second status indicating that for at least one of the elements of the piece of data, consistency with the corresponding element in the secondary memory means is guaranteed, and a third status indicating that for all elements in the piece of data in the main memory means, consistency with the corresponding elements in the piece of data in the secondary memory means is not guaranteed.

8. The database apparatus of claim 5, further comprising:
invalidation means for writing a predetermined value indicating that an element has not been read to each area unit where the element is stored in the area for storing data in the main memory means, the second determination means determining that this element is valid when a value other than the predetermined value has been written to the area unit in the main memory means.

9. A database apparatus that reads pieces of data in storage format on a secondary memory device as pieces of data in computable format on a main memory device to process the pieces of data and writes out pieces of data in computable format on the main memory device as pieces of data in storage format on the secondary memory device, the database apparatus comprising:
secondary memory means for storing pieces of data, each of which includes a plurality of elements as data in storage format;
main memory means for storing pieces of data, each of which includes a plurality of elements as data in computable format, and for storing validity of the pieces of data, the validity indicating consistency between elements in each of the nieces of data stored in the main memory means and elements in a corresponding piece of data stored in the secondary memory means;
a main memory manager that performs a check as to whether one of the pieces of data stored in the secondary memory means has been updated, and updates the validity of the pieces of data stored in the main memory means in accordance with the check;
first determination means for determining whether one of the pieces of data stored in the main memory means contains at least one element that is inconsistent with the corresponding element in the secondary memory means based on the validity of the pieces of data stored in the main memory means;
second determination means for determining an invalid element and a valid element in a piece of data which are inconsistent and consistent, respectively, with the corresponding element in the secondary memory means, the first determination means determining that at least one element of that piece of data is inconsistent with the corresponding element in the secondary memory means;
loading means for converting the elements in storage format that correspond to the element that the second determination means has determined to be invalid into computable format and for loading the element into the main memory means the main memory manager updating the validity of the pieces of data stored in the main memory means in accordance with loading of the elements by the loading means; and
storage means for converting the elements in computable format that correspond to the element that the second determination means has determined to be valid into storage format and for storing the element from the main memory means in the secondary memory means.

10. The database apparatus of claim 9, wherein the main memory means has a first cache that stores data in storage format and a second cache that stores data in computable format, the loading means including means for converting elements in storage format from the first cache into computable format and for writing this to the second cache, the storage means including means for converting elements in computable format from the second cache to storage format and for writing these elements out to the first cache, the database apparatus further comprising reading and writing means for reading data from the secondary memory means into the first cache and for writing data from the first cache out to the secondary memory means.

11. The database apparatus of claim 10, wherein the data that is processed includes objects each of which contains a plurality of element data, the first cache storing objects in storage format and the second cache storing objects in computable format, wherein a reading or writing process is conducted in element data contained in the object between the first cache and the second cache.

12. The database apparatus of claim 10, wherein the data that is processed includes collections each containing a plurality of objects, the first cache storing objects in storage and the second cache storing objects in computable format, wherein a reading or writing process is conducted in element data units contained in each object between the first cache and the second cache.

13. The database apparatus of claim 10, wherein the data that is processed are a bucket and an index both containing a plurality of element data, the first cache storing the index and the bucket in storage format and the second cache storing the index and the bucket in computable format, a reading or writing process is conducted in the element data contained in the index and the bucket between the first cache and the second cache.

14. A database apparatus that mutually converts and uses pieces of data in storage format that are suitable for data storage and pieces of data in computable format for data processing, the apparatus comprising:
first memory means for storing pieces of data, each of which containing a plurality of elements in computable format;
second memory means for storing pieces of data, each of which containing a plurality of elements in storage format;
access request signal receiving means for receiving access requests from the application program for one of the elements of the pieces of data; and
data format conversion means for converting the format of only the element for which an access request has been received between the first memory means and the second memory means when the access request is received for an element by the access request signal receiving means, wherein when the access request is received for the pieces of data, the format of the pieces of data for which the access request has been received is converted between the first memory means and the second memory means.

15. A database apparatus management method that writes pieces of data that are in storage format in a secondary memory device onto a main memory device as pieces of data in computable format to process the pieces of data, the method comprising the steps of:
storing validity about the pieces of data, the validity indicating consistency between elements in each of the pieces of data stored in the main memory device and elements in a corresponding piece of data stored in the secondary memory device;
performing a check as to whether one piece of data stored in the secondary memory device has been updated, and updating the validity of the pieces of data stored in the main memory device in accordance with the check;

determining whether one of the pieces of data that is stored in the main memory device contains at least one element that is inconsistent with the corresponding element in the secondary memory device based on the validity;

determining an invalid element in the piece of data which is inconsistent with the corresponding element in the secondary memory device according to the first determination step determining that the piece of data contains an invalid element that is inconsistent with the corresponding element in the secondary memory device;

converting elements in storage format corresponding to the element that has been determined to be invalid to computable format, and written into the main memory device; and updating the validity of the pieces of data stored in the main memory device in accordance with conversion of the element.

16. A database apparatus management method that writes pieces of data that are in storage format in a secondary memory device onto a main memory device as pieces of data in computable format to process the pieces of data, the method comprising the steps of:

storing validity about the pieces of data, the validity indicating consistency between elements in each of the pieces of data stored in the main memory device and elements in a corresponding piece of data stored in the secondary memory device;

receiving a loading request for an element in one of the pieces of data;

performing a check as to whether one niece of data stored in the secondary memory device has been updated, and updating the validity of the pieces of data stored in the main memory device in accordance with the check;

determining whether one of the pieces of data that is stored in the main memory device and contains the element for which a loading request has been received contains at least one invalid element that is inconsistent with the corresponding element in the secondary memory device based on the validity;

determining an invalid element in a piece of data which is inconsistent with the corresponding element in the secondary memory device according to the first determination step determining that the piece of data contains an invalid element that is inconsistent with the corresponding element in the secondary memory device;

converting the corresponding element in storage format to computable format when the element has been determined to be invalid; and updating the validity of the pieces of data stored in the main memory device in accordance with conversion of the element.

17. A database apparatus management method that writes pieces of data that are in computable format in a main memory device into a secondary memory device as pieces of data in storage format, the method comprising the steps of:

storing validity about the pieces of data, the validity indicating consistency between elements in each of the pieces of data stored in the main memory device and elements in a corresponding piece of data stored in the secondary memory device;

performing a check as to whether one piece of data stored in the secondary memory device has been updated, and updating the validity of the pieces of data stored in the main memory device in accordance with the check;

determining whether one of the pieces of data that is stored in the main memory device contains at least one element that is consistent with the corresponding element in the secondary memory device based on the validity;

determining a valid element in the piece of data which is consistent with the corresponding element in the secondary memory device according to the first determination step determining that the piece of data contains a valid element that is consistent with the corresponding element in the secondary memory device; and converting the element in computable format corresponding to the element that has been determined to be valid to storage format and for storing the element in the secondary memory device.

18. A database apparatus management method that writes pieces of data that are in computable format in a main memory device into a secondary memory device as pieces of data in storage format, the method comprising the steps of:

storing validity about the pieces of data, the validity indicating consistency between elements in each of the pieces of data stored in the main memory device and elements in a corresponding piece of data stored in the secondary memory device;

receiving a storing request for an element in one of the pieces of data;

performing a check as to whether one piece of data stored in the secondary memory device has been updated, and updating the validity of the pieces of data stored in the main memory device in accordance with the check;

determining whether one of the pieces of data that is stored in the main memory device and contains the element for which a storing request has been received contains at least one valid element that is consistent with the corresponding element in the secondary memory device based on the validity;

determining a valid element in a piece of data which is consistent with the corresponding element in the secondary memory device according to the first determination step determining that the piece of data contains a valid element that is consistent with the corresponding element in the secondary memory device; and converting the corresponding element in computable format to storage format and writing it from the main memory device to the secondary memory device when the element has been determined to be valid.

* * * * *